United States Patent
Ward et al.

(10) Patent No.: US 11,861,301 B1
(45) Date of Patent: Jan. 2, 2024

(54) PART SORTING SYSTEM

(71) Applicant: The Boeing Company, Arlington, VA (US)

(72) Inventors: Theresa Nadine Ward, Redmond, WA (US); David Donald Pokrajac, Everett, WA (US); Abdullah Farid Adlouni, Kenmore, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 18/177,217

(22) Filed: Mar. 2, 2023

(51) Int. Cl.
| | | |
|---|---|---|
| *G06F 17/00* | (2019.01) | |
| *G06F 40/18* | (2020.01) | |
| *G06F 40/242* | (2020.01) | |
| *G06F 40/279* | (2020.01) | |
| *G06F 40/232* | (2020.01) | |
| *G06T 11/20* | (2006.01) | |
| *G06F 40/247* | (2020.01) | |

(52) U.S. Cl.
CPC ............ *G06F 40/18* (2020.01); *G06F 40/232* (2020.01); *G06F 40/242* (2020.01); *G06F 40/247* (2020.01); *G06F 40/279* (2020.01); *G06T 11/206* (2013.01)

(58) Field of Classification Search
CPC ...... G06F 40/18; G06F 40/232; G06F 40/242; G06F 40/247; G06F 40/279; G06T 11/206
See application file for complete search history.

(56) References Cited

U.S. PATENT DOCUMENTS

| | | | |
|---|---|---|---|
| 7,395,256 B2 | 7/2008 | Ji et al. | |
| 7,567,954 B2 | 7/2009 | Murakami et al. | |
| 7,584,189 B2 | 9/2009 | Murakami et al. | |
| 7,788,264 B2 | 8/2010 | Zhu et al. | |
| 7,958,136 B1* | 6/2011 | Curtis | G06F 16/313 707/758 |
| 8,380,698 B2* | 2/2013 | Sundaranatha | G06F 16/313 707/706 |

(Continued)

FOREIGN PATENT DOCUMENTS

| | | |
|---|---|---|
| CN | 1438592 A | 8/2003 |
| CN | 104156507 A | 11/2014 |

(Continued)

*Primary Examiner* — Laurie A Ries
(74) *Attorney, Agent, or Firm* — YEE & ASSOCIATES, P.C.

(57) ABSTRACT

A method, apparatus, and computer system for grouping parts. Sets of unigrams are generated from text in part lists for parts in a family of parts using natural language processing, wherein a set of unigrams in the sets of unigrams represent components for a part in the parts. A document term matrix is created using the sets of unigrams. The document term matrix describes a presence of components in the parts. A number of unigrams from the document term matrix that has occurrences in the document term matrix that are greater than a common design threshold is removed. Removing the number of unigrams from the document term matrix forms a processed document term matrix. The common design threshold identifies a level of occurrence not useful in differentiating the parts from each other. The parts are clustered into groups using the processed document term matrix.

24 Claims, 13 Drawing Sheets

(56) References Cited

U.S. PATENT DOCUMENTS

| | | | |
|---|---|---|---|
| 8,423,350 B1 * | 4/2013 | Chandra | G06F 16/31 |
| | | | 725/35 |
| 8,631,007 B1 * | 1/2014 | Blandford | G06Q 30/0241 |
| | | | 707/736 |
| 8,880,526 B2 * | 11/2014 | Bhattacharya | G06F 16/35 |
| | | | 707/737 |
| 9,658,824 B1 * | 5/2017 | Shao | G06F 16/248 |
| 9,785,919 B2 | 10/2017 | Diwinsky et al. | |
| 10,922,734 B2 * | 2/2021 | Chandramouli | G06Q 30/0625 |
| 11,036,764 B1 | 6/2021 | Zelenov et al. | |
| 11,720,903 B1 * | 8/2023 | Henryson | G06F 16/285 |
| | | | 706/11 |
| 2006/0142993 A1 | 6/2006 | Menendez-Pidal | G06F 16/353 |
| | | | 707/E17.09 |
| 2006/0259481 A1 * | 11/2006 | Handley | G06F 40/30 |
| | | | 707/999.005 |
| 2009/0300486 A1 * | 12/2009 | Zhu | G06F 16/345 |
| | | | 704/9 |
| 2011/0106807 A1 * | 5/2011 | Srihari | G06F 16/288 |
| | | | 707/E17.046 |
| 2011/0264997 A1 * | 10/2011 | Mukerjee | G06F 16/3334 |
| | | | 707/769 |
| 2012/0117076 A1 * | 5/2012 | Austermann | G06F 16/3338 |
| | | | 707/E17.049 |
| 2013/0007020 A1 * | 1/2013 | Basu | G06F 16/367 |
| | | | 707/750 |
| 2016/0103823 A1 | 4/2016 | Jackson, Jr. et al. | |
| 2016/0117386 A1 * | 4/2016 | Ajmera | G06F 40/30 |
| | | | 707/740 |
| 2016/0188566 A1 * | 6/2016 | Jifroodian-Haghighi | |
| | | | G09B 5/02 |
| | | | 704/10 |
| 2017/0329760 A1 * | 11/2017 | Rachevsky | G06F 40/247 |
| 2019/0340949 A1 * | 11/2019 | Meisner | G09B 5/04 |
| 2020/0074312 A1 | 3/2020 | Liang et al. | |
| 2021/0027141 A1 * | 1/2021 | MacAvaney | G06F 17/15 |
| 2022/0147792 A1 | 5/2022 | Jiao et al. | |
| 2022/0398365 A1 * | 12/2022 | Kumar | G06Q 50/04 |
| 2023/0144379 A1 * | 5/2023 | Haikin | G10L 15/10 |
| | | | 704/235 |

FOREIGN PATENT DOCUMENTS

| | | | | |
|---|---|---|---|---|
| CN | 104156507 B | | 5/2017 | |
| CN | 111291552 A | * | 6/2020 | |
| CN | 110019794 B | * | 4/2023 | G06F 17/30705 |

* cited by examiner

| PART ID 318 | HOUSING 320 | SPRING 322 | O-RING 324 | POPPET 326 | GATE 328 | SOLENOID 330 |
|---|---|---|---|---|---|---|
| VT1 | 1 | 1 | 1 | 1 | 0 | 0 |
| XR5 | 1 | 1 | 1 | 1 | 0 | 0 |
| D3R | 1 | 0 | 1 | 0 | 1 | 1 |
| R3X | 1 | 0 | 1 | 0 | 1 | 1 |

FIG. 3

PART SORTING SYSTEM

BACKGROUND INFORMATION

1. Field

The present disclosure relates generally to an improved computer system and in particular, to a method, apparatus, system, and computer program product for sorting and categorizing parts based on design.

2. Background

Commercial airplanes can have hundreds of thousands of parts to millions of parts. These parts can include, for example, a line replaceable unit, an environmental control unit, a flight entertainment system, a transponder, a satellite antenna, a wing tip antenna, a battery, a radio transceiver, a display, an electrical power and control unit, a fan, a pump, a valve, and other types of parts. A part is comprised of components that are assembled to form the part.

With the large number of parts used in commercial airplanes, analyzing parts for managing part inventories, part procurement from vendors, assembly processes, and maintenance processes can be difficult to perform. Sources of part information for analyzing parts used in commercial airplanes can include computer-aided design models, part lists, bills of materials, and other sources. Identifying groups of parts for use in performing analysis of parts can be difficult with these sources of part information.

Therefore, it would be desirable to have a method and apparatus that take into account at least some of the issues discussed above, as well as other possible issues. For example, it would be desirable to have a method and apparatus that overcome a technical problem with analyzing parts from currently available sources of part information for use managing use in managing those parts.

SUMMARY

An embodiment of the present disclosure provides a method for grouping parts. Sets of unigrams are generated by a computer system from text in part lists for parts in a family of parts using natural language processing. A set of unigrams in the sets of unigrams represent components for a part in the parts. A document term matrix is created by the computer system using the sets of unigrams. The document term matrix describes a presence of components in the parts. A number of unigrams from the document term matrix that has occurrences in the document term matrix that are greater than a common design threshold is removed by the computer system. Removing the number of unigrams from the document term matrix forms a processed document term matrix. The common design threshold identifies a level of occurrence not useful in differentiating the parts from each other. The parts are clustered by the computer system into groups by using the processed document term matrix.

Yet another embodiment of the present disclosure provides a method for grouping parts. Sets of unigrams are generated by the computer system from text in part lists for parts in a family of parts using natural language processing. A set of unigrams in the sets of unigrams represent components for a part in the parts. A document term matrix is created by the computer system using the sets of unigrams. The document term matrix describes a presence of components in the parts. A number of unigrams from the document term matrix that has occurrences in the document term matrix that are greater than a common design threshold is removed by the computer system. Removing the number of unigrams from the document term matrix forms a processed document term matrix. The common design threshold identifies a level of occurrence not useful in differentiating the parts from each other. Features are determined by the computer system from the unigrams in the processed document term matrix. The features are formed from a combination of the unigrams. The unigrams are replaced by the computer system with the features in the processed document term matrix. The parts are clustered by the computer system into groups using the processed document term matrix.

Still another embodiment of the present disclosure provides a part analysis system. The part analysis system comprises a computer system and a part analyzer in the computer system. The part analyzer is configured to generate sets of unigrams from text in part lists for parts in a family of parts using natural language processing. A set of unigrams in the sets of unigrams represent components for a part in the parts. The part analyzer is configured to create a document term matrix using the sets of unigrams. The document term matrix describes a presence of components in the parts. The part analyzer is configured to remove a number of unigrams from the document term matrix that has occurrences in the document term matrix that are greater than a common design threshold. Removing the number of unigrams from the document term matrix forms a processed document term matrix. The common design threshold identifies a level of occurrence not useful in differentiating the parts from each other. The part analyzer is configured to cluster the parts into groups using the processed document term matrix.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a binary document term matrix in accordance with an illustrative embodiment;

DETAILED DESCRIPTION

Figure 1:
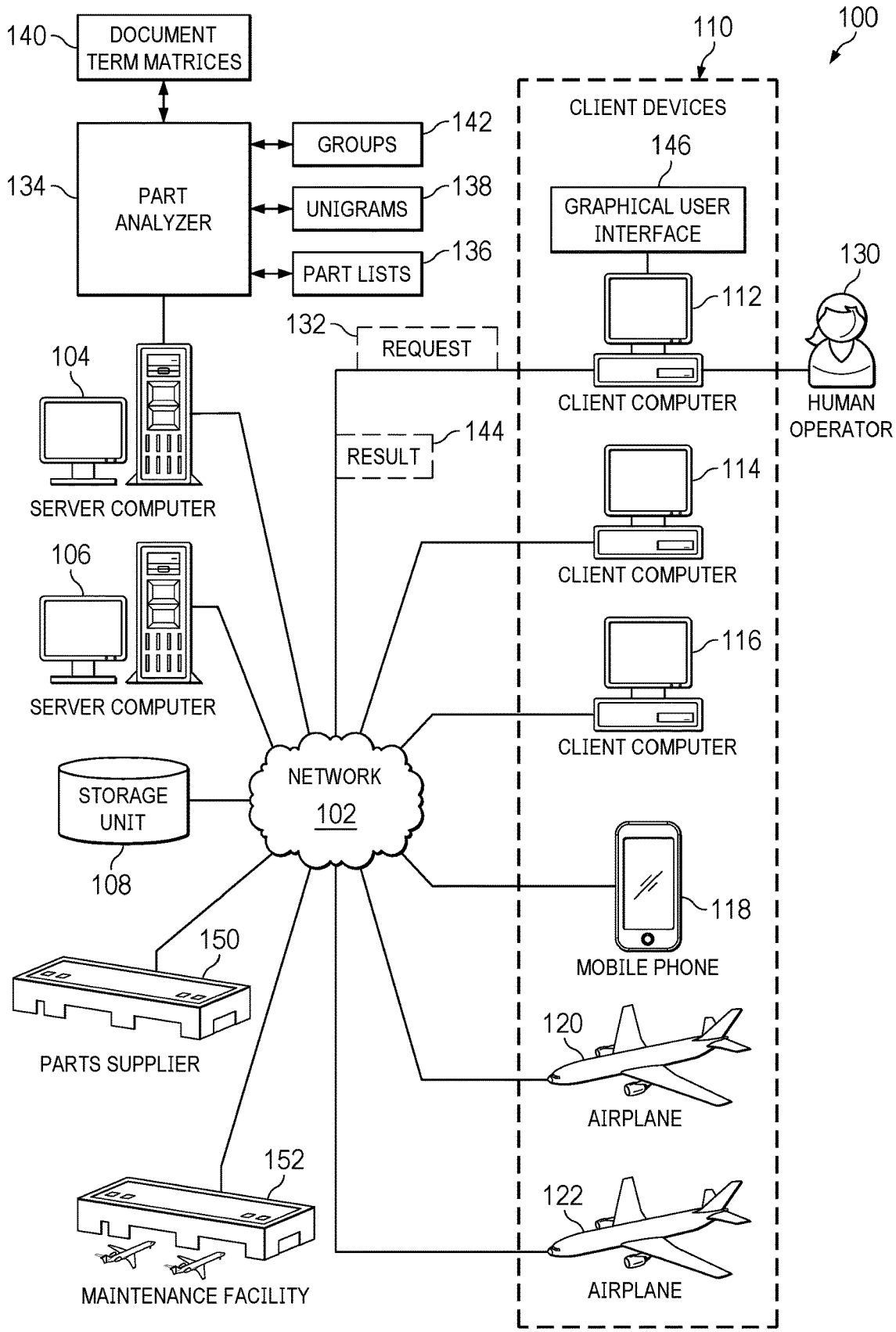
FIG. 1 is a pictorial representation of a network of data processing systems in which illustrative embodiments may be implemented.

The illustrative embodiments recognize and take into account one or more different considerations. For example, with hundreds of thousands of parts, sorting these parts into groups is a tedious and time-consuming process that is currently performed by human operators. A human operator can review the computer-aided designs (CAD) for each part in attempting to sort or group parts. However, this process is subjective and can result in different groupings based on the subjective decisions of the human operators.

The illustrative embodiments recognize and take into account that another approach involves sorting parts into groups based on a similarity of part designs. This similarity can be determined using a part list. By analyzing part lists, automated sorting or categorizing of parts into groups can be performed. A cost analysis and other analysis can be made with respect to the grouping of parts.

However, grouping parts based on information from part lists can be tedious and time-consuming. The raw text in the part lists contains information that is not useful for grouping parts. With millions of part lists, the analysis and grouping of parts can use much more processing resources and time than desired.

Thus, the illustrative embodiments provide a method, apparatus, system, and computer program product grouping parts. In one illustrative example, sets of unigrams are generated from text in part lists for parts in a family of parts using a natural language processing method. A set of unigrams in the sets of unigrams represent components for a part in the parts. A document term matrix using the sets of unigrams is created. The document term matrix describes a presence of components in the parts. A number of unigrams from the document term matrix that have occurrences in the document term matrix that are greater than a common design threshold is removed. Removing the number of unigrams from the document term matrix forms a processed document term matrix. The common design threshold identifies a level of occurrence not useful in differentiating the parts from each other.

As used herein, "a number of" when used with reference items means one or more items. For example, a number of unigrams is one or more unigrams. Additionally, as used herein, "a set of" when used with reference items means one or more items. For example, a set of unigrams is one or more unigrams.

The parts are clustered into groups using the processed document term matrix. Each of these groups can represent one or more parts in a family of parts. Each group of parts can be grouped based on the components that form the parts. For example, when the family of parts is valves, then each group can represent particular types of valves that that grouped in using a clustering process. The grouping of the valves into groups is performed based on the components that form the valves. the components for analysis can be selected as component that represent design features that can distinguish different types of valves from each other.

This process can be performed for each family of parts. For example, the grouping can be performed for valves. The process can then be performed again for display panels.

With this ability to more quickly and accurately group parts, groupings can be displayed and analyzed. The analysis can be performed to reduce costs in managing parts. This reduction can include managing inventories and purchasing parts based on the analysis of the grouping of parts in a family of parts.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, airplane 120, and airplane 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, human operator 130 can sort parts for aircraft such as airplane 120 and airplane 122. In these examples, airplane 120 and airplane 122 are commercial airplanes and can have millions of parts.

As depicted, the sorting can be performed by human operator 130 using client computer 112. As depicted, human operator 130 can send request 132 to part analyzer 134 located in server computer 104 over network 102 from client computer 112 to group parts.

In this example, request 132 can be a request to sort all parts in airplane 120 into groups. In another example, request 132 can be to sort a particular family of parts used in airplane 120 into groups. For example, a family of parts can be a valve, a flight entertainment system, a pump, or some other family of parts.

In yet another illustrative example, request 132 can be a request to sort parts for a particular model of aircraft into groups. In yet another illustrative example, request 132 can be performed to group parts for aircraft operated by an airline.

As depicted in this example, part analyzer 134 uses part lists 136 in response to receiving request 132. A part list in part lists 136 can be, for example, a bill of materials. These part lists can be obtained from a database or other repository of part lists such as storage unit 108. In other illustrative examples, these part lists can be located in distributed locations across different storage units at location such as part supplier 150 and maintenance facility 152. These part lists can be created and managed by at least one of an aircraft design system, an inventory management system, a materials requirement planning system, a parts ordering system, or other system that can maintain part lists for use in grouping parts for aircraft.

As depicted, part analyzer 134 generates sets of unigrams 138 from the text in part lists 136. These unigrams can be processed to create consistency and reduce unnecessary information. In other words, unigrams 138 can be processed to refer to the same components using the same words or acronyms. Further, the consistency can also be obtained by removing spelling errors and incorrect concatenations. Additionally, unigrams 138 can be processed to remove words from part lists 136 that do not contribute to distinguishing one part from another part. In other words, unigrams 138 can be processed to remove common words such as "the", "a" "and", and other terms that do not describe components in part lists 136.

In this illustrative example, part analyzer 134 creates document term matrices 140 from unigrams 138. A document term matrix is created for each family of parts in this example. For example, a document term matrix can be created for valves. Another document term matrix can be created for pumps, and yet another document term matrix can be created for actuators.

In this example, each part list in part lists 136 identifies one or more parts. The part lists can also identify what family of parts that a part belongs to.

The components represented by these unigrams are considered design features for the parts. However, many of these design features may be so common that these they are not considered to be sufficiently important to compare parts to each other in determining whether the parts should be placed in the same group. Thus, some components for design feature may not be design differentiating features.

In this example, part analyzer 134 can remove unigrams in document term matrices 140 that have an occurrence that is greater than a common design threshold. This threshold is selected to indicate when the level of occurrence is high enough that that the unigrams for particular component is not useful in distinguishing parts from each other. As result, the processing of document term matrices 140 by part analyzer 134 results in document term matrices 140 that contain unigrams 138 that have differentiating design features.

The removal of unigrams 138 that do not have differentiating design features can serve to remove noise from unigrams 138. This removal of noise can reduce the amount of processing resources and time needed to sort parts into groups. As result, part analyzer 134 in server computer 104 causes server computer 104 to operate as an improved computer as compared to other computers that do not use part analyzer 134.

After removing unigrams from document term matrices 140, part analyzer 134 can cluster the parts into groups 142 using document term matrices 140.

Part analyzer 134 can return result 144 to client computer 112 over network 102 for display to human operator 130 and client computer 112. In this example, the display of result 144 can be in a graphical form on a graphical user interface 146 for client computer 112.

In this example, human operator 130 can use result 144 to perform various analysis to manage parts for airplane 120 as well as other airplanes. For example, human operator 130 can use result 144 to perform part cost modeling for the parts in airplanes such as airplane 120 in a fleet of aircraft. Result 144 can be used for analysis and analytics related to procurement cost avoidance by maintenance facility 152.

Additionally, result 144 can also be used to determine when more diversity in vendors for a particular part group may be needed. For example, if a particular part model of a check valve is only supplied by a single vendor. The grouping of parts can also be used to identify other vendors that may manufacture or supply check valves. A request can be made to these vendors to also supply that model of the check valve such that a more diverse group of vendors are available to supply that particular part.

Figure 2:
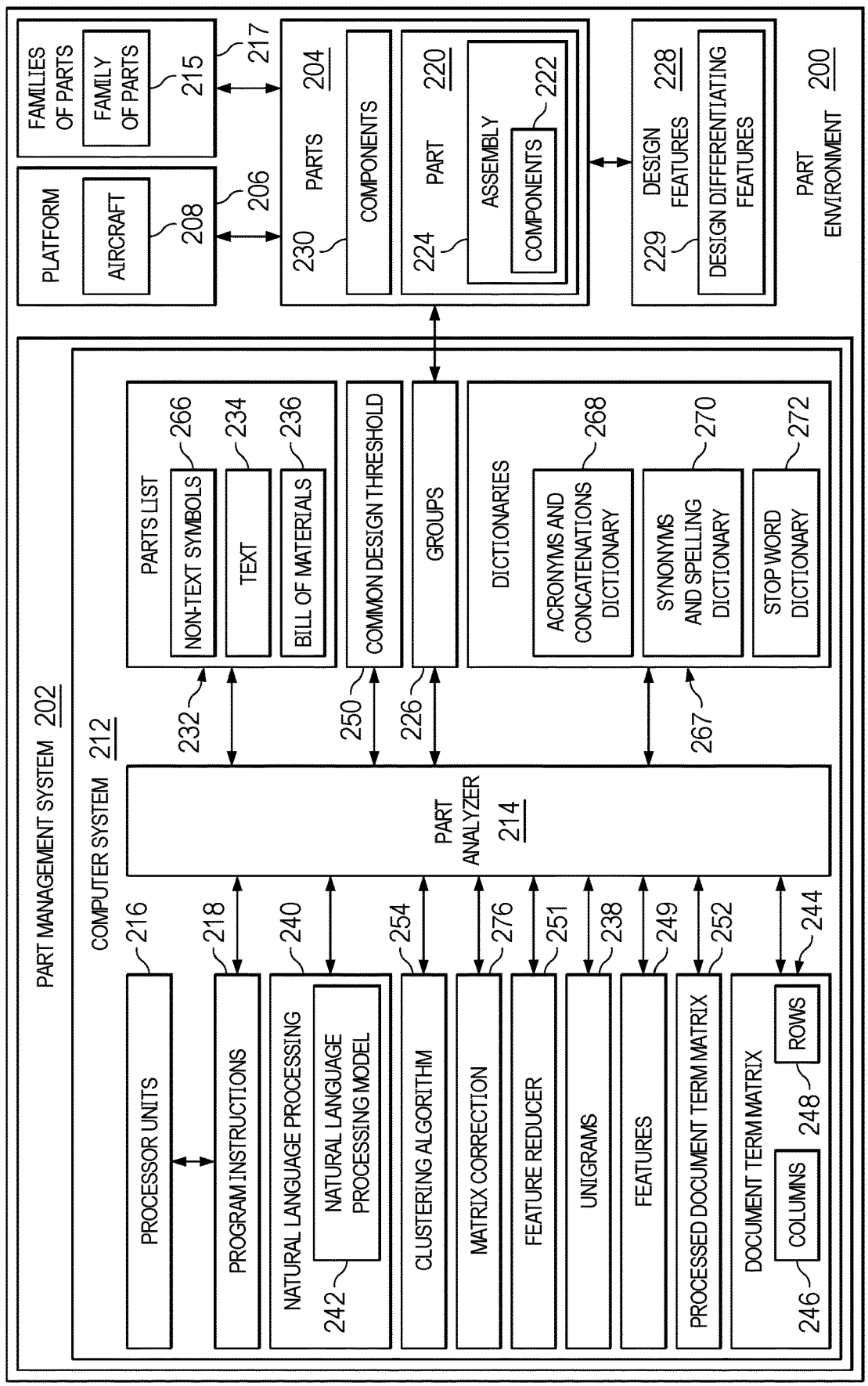
FIG. 2 is a block diagram of a parts environment in accordance with an illustrative embodiment.

With reference now to FIG. 2, a block diagram of a parts environment is depicted in accordance with an illustrative embodiment. In this illustrative example, part environment 200 includes components that can be implemented in hardware such as the hardware shown in network data processing system 100 in FIG. 1.

In this illustrative example, part management system 202 can be used to manage parts 204 for platform 206. In this example, platform 206 is aircraft 208. As depicted, part management system 202 comprises computer system 212 and part analyzer 214.

Part analyzer 214 can be implemented in software, hardware, firmware or a combination thereof. When software is used, the operations performed by part analyzer 214 can be implemented in program instructions configured to run on hardware, such as a processor unit. When firmware is used, the operations performed by part analyzer 214 can be implemented in program instructions and data and stored in persistent memory to run on a processor unit. When hardware is employed, the hardware may include circuits that operate to perform the operations in part analyzer 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present computer system 212, those data processing systems are in communication with each other using a communications medium. The communications medium may be a network. The data processing systems can be selected from at least one of a computer, a server computer, a tablet, or some other suitable data processing system.

As depicted, computer system 212 includes a number of processor units 216 that is capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are on the same computer or on different computers. In other words, the process can be distributed between processor units 216 on the same or different computers in a computer system 212.

Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, part analyzer 214 can group parts 204 for family of parts 215 in families of parts 217. In this illustrative example, a family of parts is a collection of similar parts that can have different values for different design features. The identification of a family of parts can be based on function.

For example, parts in a family of parts can be parts that have the same function. In addition, these parts in the family of parts can also have similar features. Further, similar features can be features that provide the same function in parts in the same family of parts. For example, all of the parts in a family may have a housing although the housing may be of different sizes and materials.

In one illustrative example, family of parts 215 excludes structural parts such as a fuselage, a fuselage barrel, a wing box, or other structural parts for aircraft 208. Family of parts 215 can be, for example, line replaceable units, environmental control units, displays, antennas, actuators, pumps, valves, and other types of parts.

As depicted, part 220 in parts 204 is comprised of components 222. These components are assembled in assembly 224 to form part 220.

In one example, family of parts 215 can be valves. With this example, parts 204 in family of parts 215 identified as valves in which types of valves can be selected from at least one of a check valve, a flapper valve, a pressure relief valve, a gate valve, or other types of valves, a fuel valve, a butterfly valve, a piston engine valve, an exhaust valve, a relief valve, or other suitable type of valve.

With this example, when part 220 is a check valve in valves for family of parts 215, part 220 has two or more components. As depicted, components 222 for part 220 in the form of a check valve can comprise a poppet, a spring, an o-ring, and a housing. Other check valves in parts 204 can have one or more of these features that distinguish check valves from other types of valves in the same family of parts. For example, another check valve can have two poppets, a spring, an o-ring, and a housing.

As depicted, part analyzer 214 can cluster or group parts 204 into groups 226 based on families of parts 217. Parts 204 in each family of parts in families of parts 217 can have groupings of parts 204 in a particular family of parts using components 230 for parts 204.

In the illustrative examples, components 230 in a part represent design features 228 for the part. These components can be used to group parts 204 into groups 226. In other words, the grouping can be performed using design features 228 based on components 230 in parts 204.

This classification or grouping of parts 204 into groups 226 can be performed by part analyzer 214 in a number of different ways. In one illustrative example, part analyzer 214 can determine groups 226 for parts 204 using parts list 232 for parts 204.

As depicted, parts list 232 contains text 234. Text 234 contains text identifying components 230 in parts 204. Text 234 can also include other text such as use instructions, assembler instructions, operating conditions, and other types relating to parts 204.

In one illustrative example, parts list 232 to can take the form of bill of materials (BOM) 236. Bill of materials 236 can be a list of raw materials, components, and instructions that are used to construct, manufacture, repair, or use a part.

In one illustrative example, the processes performed by part analyzer 214 to determine groups 226 for parts 204 described with respect to a single family of parts, such as family of parts 215. This process can be performed for multiple families or all families in families of parts 217 in other examples.

In this illustrative example, part analyzer 214 generates sets of unigrams 238 from text 234 in parts list 232 for parts 204 in a family of parts 215 using a natural language processing 240. A unigram is an n-gram having a size of 1. An n-gram is a sequence of n words. For example, "housing" is a unigram. Each set of unigrams 238 in the sets of unigrams 238 is derived from text 234 for a part in parts 204. In this example, a set of unigrams 238 in the sets of unigrams 238 represents components 230 for part 220 in parts 204.

Natural language processing 240 can be performed using at least one of a method, model, or system that can operate to extract unigrams 238 from text 234. For example, natural language processing 240 can be performed using natural language processing model 242 such as a unigram language model. A unigram language model can discard all conditioning context, and estimates each term independently. Natural language processing model 242 can be implemented using a machine learning model, a deep neural network machine learning model, or other types of models.

As depicted, part analyzer 214 creates document term matrix 244 using the sets of unigrams 238. In this example, document term matrix 244 describes a presence of components 230 in parts 204. In this example, document term matrix 244 is comprised of columns 246 for unigrams 238 and rows 248 for parts 204.

A row is for a part and has values for the presence of components corresponding to unigrams 238 that form that part. In this depicted example, the value is a binary value indicating whether a component is present. This type of document term matrix is a binary document term matrix.

However, the number of unigrams 238 present document term matrix 244 can be the very large such that the amount of processing resources used in computer system 212 becomes greater than desired. The use of these processing resources for grouping parts 204 into groups 226 can result in an unavailability of computer system 212 to perform tasks with a desired level performance. This desired level performance can be defined using performance level metrics. These metrics can include, for example, response time, resource usage, and other metrics that can be measured for computer system 212 when performing various tasks.

In the illustrative examples, not all of design features 228 are necessary or useful to distinguish or group parts 204 into groups 226. Part analyzer 214 can identify design differentiating features 229 in design features 228.

Design features 228 that are not design differentiating features 229 can be removed. In other words, unigrams 238 for components 230 that are not design differentiating features 229 in design features 228 can be removed. This removal of design features 228 that are not helpful in distinguishing parts 204 is a removal of noise. As a result, the analysis of the remaining unigrams can be performed using less processing resources in computer system 212.

In this illustrative example, part analyzer 214 removes a number of unigrams 238 from document term matrix 244 that has occurrences in document term matrix 244 that are greater than a common design threshold 250. Removing the number of unigrams 238 from document term matrix 244 forms processed document term matrix 252. In this example, common design threshold 250 identifies a level of occurrence not useful in differentiating parts 204 from each other.

For example, if a unigram representing a component occurs in 95% of rows 248 for parts 204 in family of parts 215 being analyzed, the column in columns 246 for that unigram can be removed. That level of occurrence is considered to be sufficiently high that the use of the unigram in that column would not be useful or helpful in grouping parts 204 in rows 248 into groups 226. In other illustrative examples, other values can be used rather than 95%. For example, 90% or 87% can be used to determine whether a unigram should be removed from document term matrix 244.

In this illustrative example, part analyzer 214 clusters parts 204 into groups 226 using processed document term matrix 252. This clustering can be performed using clustering algorithm 254. Clustering algorithm 254 can be selected from a group comprising an agglomerative hierarchical clustering, a density based spatial clustering of applications with noise (DBSCAN) algorithm, a K means algorithm, a Gaussian mixture model (GMM) algorithm, Ordering points to identify the clustering structure (OPTICS), or other suitable type of clustering algorithm.

Other processing in addition to the operations depicted above can be performed in clustering parts into groups 226. For example, non-text symbols 266 can be removed from parts list 232 prior to generating sets of unigrams 238.

Further, unigrams 238 can be processed for consistency prior to creating document term matrix 244. This processing can be performed using one or more of dictionaries 267. In this example, dictionaries 267 comprises acronyms and concatenations dictionary 268, synonyms and spelling dictionary 270, and stop word dictionary 272.

In this illustrative example, dictionaries 267 can be domain specific to the particular family of parts being processed. For example, the dictionaries can include a dictionary specific to valves when the family of parts are valves. If the family of parts are flight entertainment systems, the dictionaries used are specific to flight entertainment systems.

In this example, acronyms and concatenations dictionary 268 be used by part analyzer 214 to expand acronyms such of the unigrams use words rather than acronyms. In another example, the words can be changed into acronyms such that all the unigrams are consistent for a particular component. The concatenations can be used to remove incorrect concatenations or create concatenations that are correct for the unigrams based on the usage in the dictionary.

As another example, synonyms and spelling dictionary 270 can be used by part analyzer 214 to use the same wording for the same components in a family of parts. Further, part analyzer 214 can use stop word dictionary 272 to remove non-technical unigrams. These non-technical unigrams are not associated with the design features for parts 204 in the families of parts 217.

For example, words such as o-ring, nut, housing, and body are examples of unigrams representing components in the parts such as valves. However, these unigrams can be components that are sufficiently common that these unigrams do not help differentiate family of parts 215 from each other in families of parts 217.

Additionally, part analyzer 214 can apply matrix correction 276 based on the number of groups selected for parts 204. In this example, using matrix correction 276 is a process that removes unigrams 238 from document term matrix 244 based on the frequency of unigrams 238 in document term matrix 244. Matrix correction 276 is a sparse matric correction when applied to document term matrix 244 in the form of a sparse document term matrix in which the sparse document term matrix has a large number of zero values.

In removing unigrams 238, part analyzer 214 can remove more unigrams from unigrams 238 when fewer groups are desired for groups 226. For example, a lower number of groupings can be obtained in which less design differentiation occurs by removing unigrams that occur with a frequency in document term matrix 244 that is greater than 15%.

When larger numbers of groups are desired, part analyzer 214 can remove fewer unigrams. For example, matrix correction can be performed such that unigrams are removed when unigrams have a frequency of less 10% or less within document term matrix 244. In another example, matrix correction 276 can be applied to unigrams 238 in document term matrix 244 such that the minimum document frequency is from about 10% to 15%.

In another illustrative example, part analyzer 214 can reduce the number of dimensions in processed document term matrix 252 using feature reducer 251. Part analyzer 214 can use feature reducer 251 to replace unigrams 238 with features 249 in processed document term matrix 252. In other words, part analyzer 214 can determine features 249 from unigrams 238 in processed document term matrix 252.

In this illustrative example, features 249 are a combination of unigrams 238 in processed document term matrix 252. In other words, each feature in features 249 can be a combination of two or more of unigrams 238. With the reduction in the number of dimensions, processed document term matrix 252 is an embedding matrix in which high-dimensional data is converted to low-dimensional data.

Feature reducer 251 can reduce the number of dimensions by combining unigrams 238 into features 249 using a number of different techniques. For example, feature reducer 251 can be use multiple correspondence analysis (MCA). With the use of feature reducer 251, the clustering of parts 204 into groups 226 is performed using features 249 in processed document term matrix 252 instead of unigrams 238.

In one illustrative example, one or more technical solutions are present that overcome a technical problem with grouping parts using part lists in a more efficient manner. As a result, one or more technical solutions may provide a technical effect in enabling increased efficiency and speed in grouping parts into groups.

In the illustrative examples, the part lists are processed in a manner that reduces the information in part lists that not useful in grouping parts. For example, one or more illustrative examples can identify unigrams that are useful in distinguishing parts to group the parts. In one or more illustrative examples, unigrams can be removed when those unigrams do not represent components that have design differentiating features that can be used to group parts.

The different operations performed by part analyzer 214 to remove unigrams 238 that are not useful can increase the efficiency at which computer system 212 operates to group parts into groups. These different techniques employed by part analyzer 214 are not present in currently used processes. As a result, part analyzer 214 can sort or group parts into groups more efficiently as compared to current grouping processes. Further, the illustrative examples can also reduce the number of dimensions of unigrams to simplify the grouping of parts.

Computer system 212 can be configured to perform at least one of the steps, operations, or actions described in the different illustrative examples using software, hardware, firmware or a combination thereof. As a result, computer system 212 operates as a special purpose computer system in which part analyzer 214 in computer system 212 enables grouping parts. In particular, part analyzer 214 transforms computer system 212 into a special purpose computer system as compared to currently available general computer systems that do not have part analyzer 214. In other words, other general-purpose computers without part analyzer 214 are unable to process parts list 232 to create unigrams 238 and process those unigrams for processed document term matrix 252 that can be analyzed in a manner that has increased performance as compared to current techniques.

For example, by removing the information that is not useful in distinguishing parts, process document term matrix 252 can be processed more quickly by part analyzer 214 in computer system 212. The different operations are performed automatically by part analyzer 214 without needing user input. Further, a lower use of resources in computer system 212 occurs through the removal of design features 228 that are not design differentiating features 229. Further, the reduction of dimensions by creating features 249 from unigrams 238 for process document term matrix 252 can also increase the performance in grouping parts 204 into groups 226.

With reference next to FIG. 3, an illustration of a binary document term matrix is depicted in accordance with an illustrative embodiment. In this illustrative example, binary document term matrix 300 is an example of an implementation for document term matrix 244 in FIG. 2.

As depicted, binary document term matrix 300 is for a family of parts in the form of valves. Binary document term matrix 300 comprises rows 301 in columns 303. Rows 301 represent parts and columns 303 represent components. In this example, the components are represented as unigrams. Each row comprises a binary indication as to whether a unigram for the column is present for that part. These indications of whether unigrams are present are determined based on the unigrams created from the part list for each of the parts in rows 301.

As depicted, row 302 and row 304 each represent check valves 307 in which each row contains unigrams created from a part list for a check valve. Row 306 and row 308 represent gate valves 305 in which each row contains unigrams created from a part list for a gate valve.

In this illustrative example, column 318 represents a part identifier. This part identifier can be a unique identifier obtained from the parts. This unique identifier can be used to determine which part list the information for a particular part was derived.

As depicted, columns 303 for unigrams are housing 320, spring 322, o-ring 324, poppet 326, gate 328, and solenoid 330.

In this example, binary document term matrix 300 can be processed to reduce the number of unigrams for clustering. For example, unigrams that occur more than some threshold level can be removed from binary document term matrix. As the occurrence of the unigrams increases in the parts in rows 301, the usefulness of those unigrams to distinguish parts from each other is reduced.

For example, housing 320 is unigram that has a 100% occurrence within binary document term matrix 300. As result, this unigram can be removed because the housing is a component is not a design differentiating feature that can be used for different valves from each other. As another example, o-ring 324 has a 100% frequency in binary document term matrix 300. This unigram also does not help in distinguishing different valves from each other.

In other words, housing 320 and o-ring 324 are unigrams for components that are not design differentiating features. As a result, processing these unigrams increases the amount of processing resources and time needed to group the parts in binary document term matrix 300. However, the use of these unigrams does not aid in differentiating check valves 307 from gate valves 305.

The illustration of binary document term matrix 300 is presented as a simplified example of document term matrix 244. This illustration is not meant to limit the manner in which other document term matrices can be implemented. Only 6 unigrams for 4 parts are depicted in this example to illustrate how binary document term matrix 300 represents parts for grouping and how some of the unigrams in the columns can be processed.

Actual implementations can include tens of thousands, hundreds of thousands, or millions of rows representing individual parts for a single family of parts. Additionally, hundreds or thousands components can be present that are used to create unigrams for populating columns in a binary document term matrix. Further, in other illustrative examples, the document term matrix can take forms other than a binary document term matrix. For example, the number of components in a part can be identified through an integer rather than a binary number for unigrams corresponding to the components.

Figure 4:
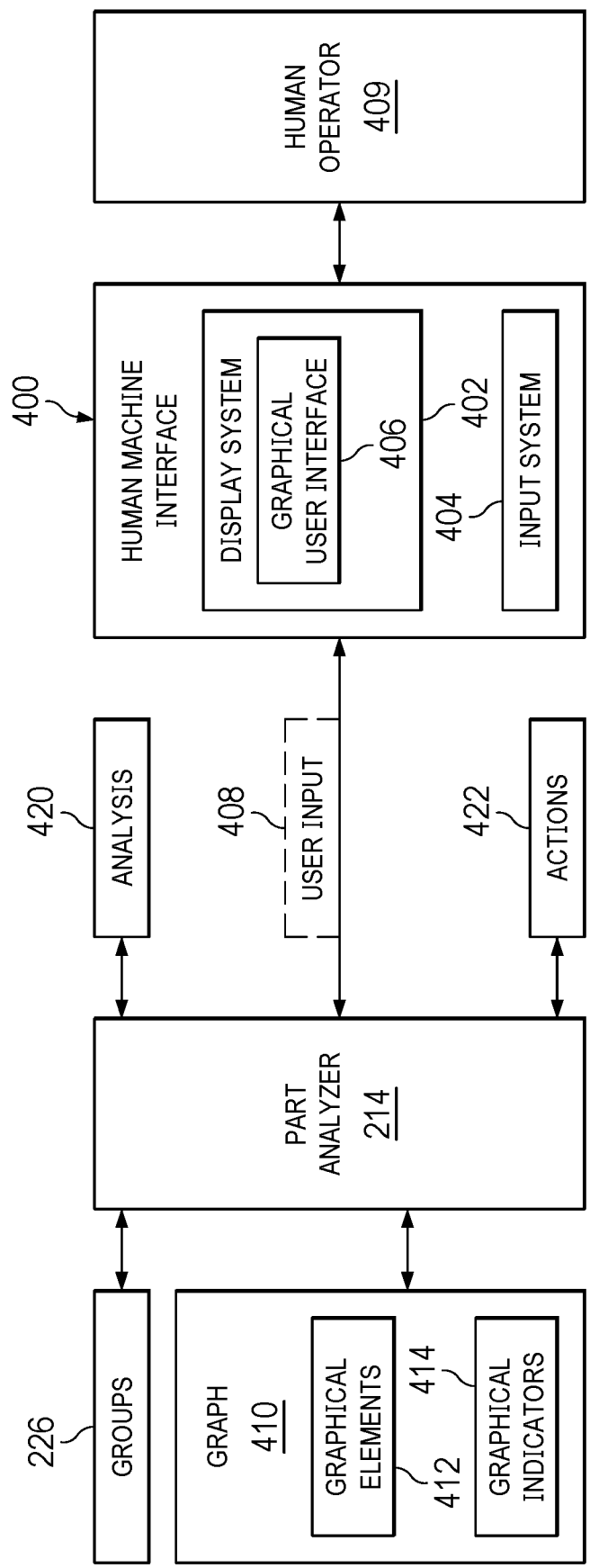
FIG. 4 is an illustration of a block diagram of analysis and actions using grouping of parts in accordance with an illustrative embodiment.

In FIG. 4, an illustration of a block diagram of analysis and actions using grouping of parts is depicted in accordance with an illustrative embodiment. In this example, with the determination of groups 226, part analyzer 214 can display graphically display groups 226 in human machine interface 400. In this example, human machine interface 400 comprises display system 402 and input system 404.

Display system 402 is a physical hardware system and includes one or more display devices on which graphical user interface 406 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

Human operator 409 is a person that can interact with graphical user interface 406 through user input 408 generated by input system 404 for computer system 212. In this example, user input 408 is received by part analyzer 214 in computer system 212. Input system 404 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

As depicted, part analyzer 214 can create graph 410 and display graph 410 on graphical user interface 406 to provide human operator 409 a visualization of groups 226. Graph 410 can comprise graphical elements 412 that represent parts 204 in groups 226.

Each graphical element can be formed from one or more of graphical indicators 414. A graphical indicator can be selected from a group comprising an icon, a pictogram, an ideogram, a graphic, an image, text, animation, bolding, a color, a line, an arrow, or other suitable graphic. In other words, graphical indicator can be a single graphical element or a combination of graphical elements.

In one example, a graphical element representing a part can comprise a graphical indicator in the form of a dot. Additionally, the dot can have a particular color to indicate the group in which the part belongs in groups 226.

In one illustrative example, groups 226 can be clustered into groups that are result of hierarchical clustering. In other words, the clustering can include information about how similar different parts are to each other in groups 226.

With this type of clustering, graph 410 can be a graph that can be used to provide visualization of hierarchies occurring in the clustering parts 204 into groups 226. For example, a constellation graph, a dendrogram, a scatterplot, or other graphs that can indicate how closely related different parts are to each other can be used.

Thus, human operator 409 can be provided with a visualization of groups 226 of parts 204. This visualization can aid human operator 409 in analyzing parts for a family of parts. This analysis can be performed for parts in inventory, parts in an aircraft, parts in a fleet of aircraft, or parts in some other location.

Further, human operator 409 can use part analyzer 214 to perform analysis 420 on groups 226 to identify actions 422 that can be performed with respect to parts 204.

In this illustrative example, analysis 420 can take a number of different forms. For example, analysis 420 can be a cost analysis, design analysis, supply chain analysis, and inventory analysis, or other suitable type of analysis that can be performed for groups 226 of parts 204. In this example, actions 422 can be selected to meet objectives selected from at least one of optimizing part costs, increasing supply chain diversity, reducing supply chain costs, increasing parts availability, reducing the number of parts in models of aircraft manufactured by manufacturer, and other suitable objectives.

For example, analysis 420 can be used to determine that check valves in different models of aircraft are sufficiently similar that these check valves can be considered substitute parts. With this situation, both check valves meet tolerances and requirements for use in both models of aircraft. With this determination through analysis 420, actions 422 can include designating the two check valves as substitutes for each other when check valves are replaced during maintenance.

As another example, one pump may be currently used in one model of aircraft. In designing a new model of an aircraft, the analysis can indicate that the part used for that new design is sufficiently similar to the current part in use. In this case, the design for the new model of an aircraft can be modified to use the same part as in the current aircraft being manufactured. As result, the number of different parts can be reduced through this engineering analysis in comparison.

Further, with respect to supply chain management, the determination can be made that valve A from Supplier AA is similar to valve B from Supplier BB. To reduce costs, supplier a may be asked to supply both valve A and valve B. When increased availability is desired, both Supplier AA can be asked to produce valve B and Supplier BB can pass to produce valve A. This increase in diversity of suppliers can be useful when some suppliers are located in geographic locations where supply chain issues can occur.

Further this analysis of parts 204 can be made for different business units. In other words, the analysis of parts 204 can be performed for more uses as other than aircraft. For example, analysis of valves can be performed across commercial airplanes, military aircraft, spacecraft, manufacturing plants, and other types of platforms that may be manufactured by different business units in a company or by different companies.

Figure 5:
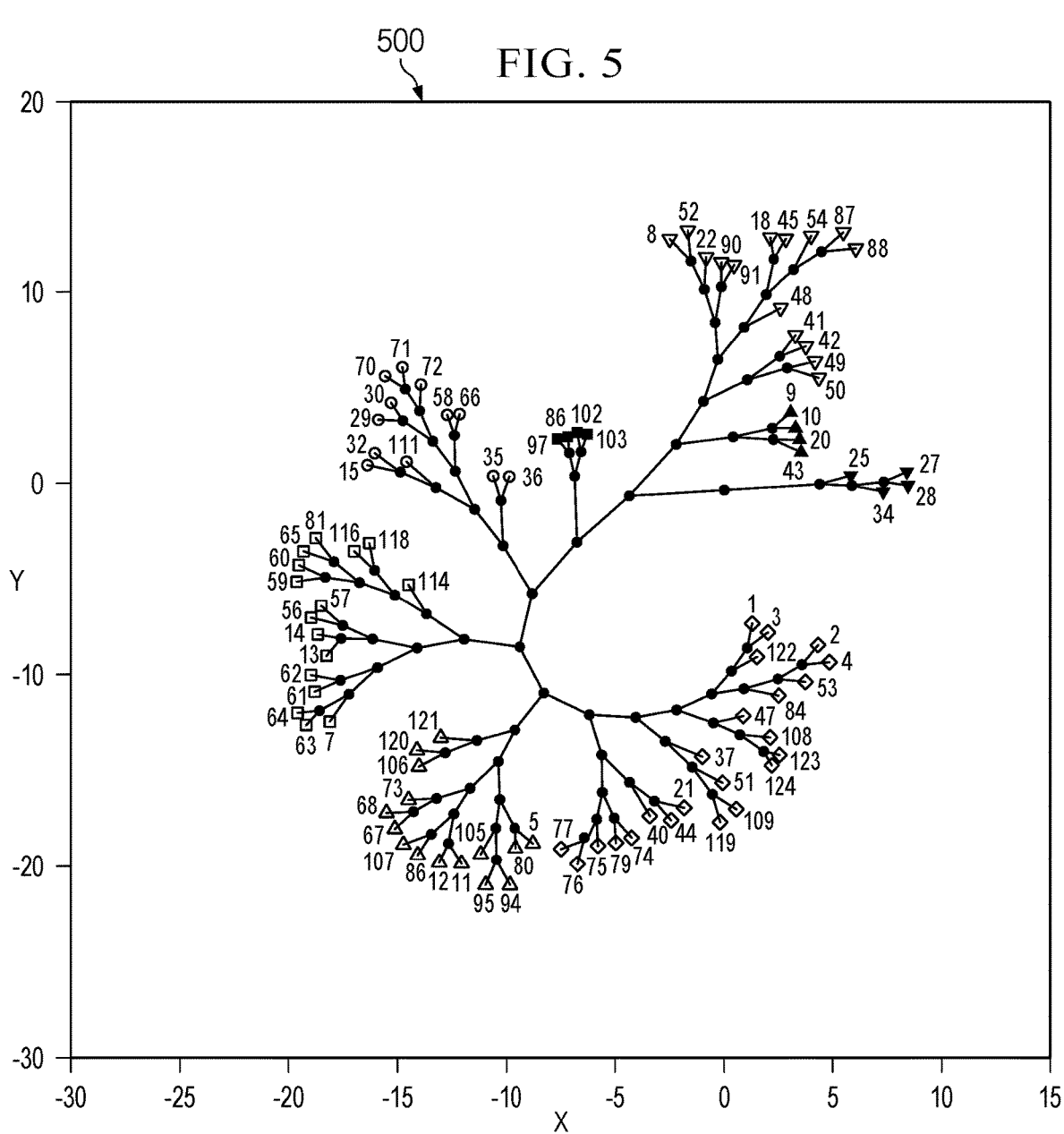
FIG. 5 is illustration of a constellation graph in accordance with an illustrative embodiment.

With reference now to FIG. 5, illustration of a constellation diagram is depicted in accordance with an illustrative embodiment. Constellation diagram 500 is an example of graph 410 in FIG. 4. This graph depicts one manner in which groups 226 can be displayed graphical user interface 406 in FIG. 4. This graph shows a hierarchical relationship between parts.

In this illustrative example, the parts are represented by graphical elements. In this example, the graphical element comprises graphical indicators in the form of a point and a shape for the point. The point represents the presence of a part. The shape of the point indicates which group the part belongs to in constellation diagram 500. The positions of the black dots are based on the hierarchies of similarity.

As depicted, the points are connected to each other by edges. In this example, the length of edge connecting two points indicates how similar the two parts represented by the points are to each other.

The illustration of constellation diagram 500 is not meant to limit the manner in which other parts can be displayed in other illustrative examples. For example, points can be shown in clusters or groupings without connectors if the hierarchical relationship indicating the similarity of parts is not shown. In other illustrative examples, the graphical indicators for the graphic elements can take the form of a point and a color in place of the shape.

Further, other types of graphs can be used in place of constellation diagram 500 when displaying groups to a human operator. These other types of graphs include, for example, dendrogram, a scatterplot, and other suitable types of graphs that can be used to indicate groups of parts.

The illustration indicates the similarity between of part environment 200 in the different components in part environment 200 in FIGS. 2-5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although the illustrative examples are described with respect to aircraft 208, another illustrative example can be applied to other types of platforms. For example, platform 206 can be, for example, a mobile platform, a stationary platform, a land-based structure, an aquatic-based structure, and a space-based structure. More specifically, platform 206 can be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 6:
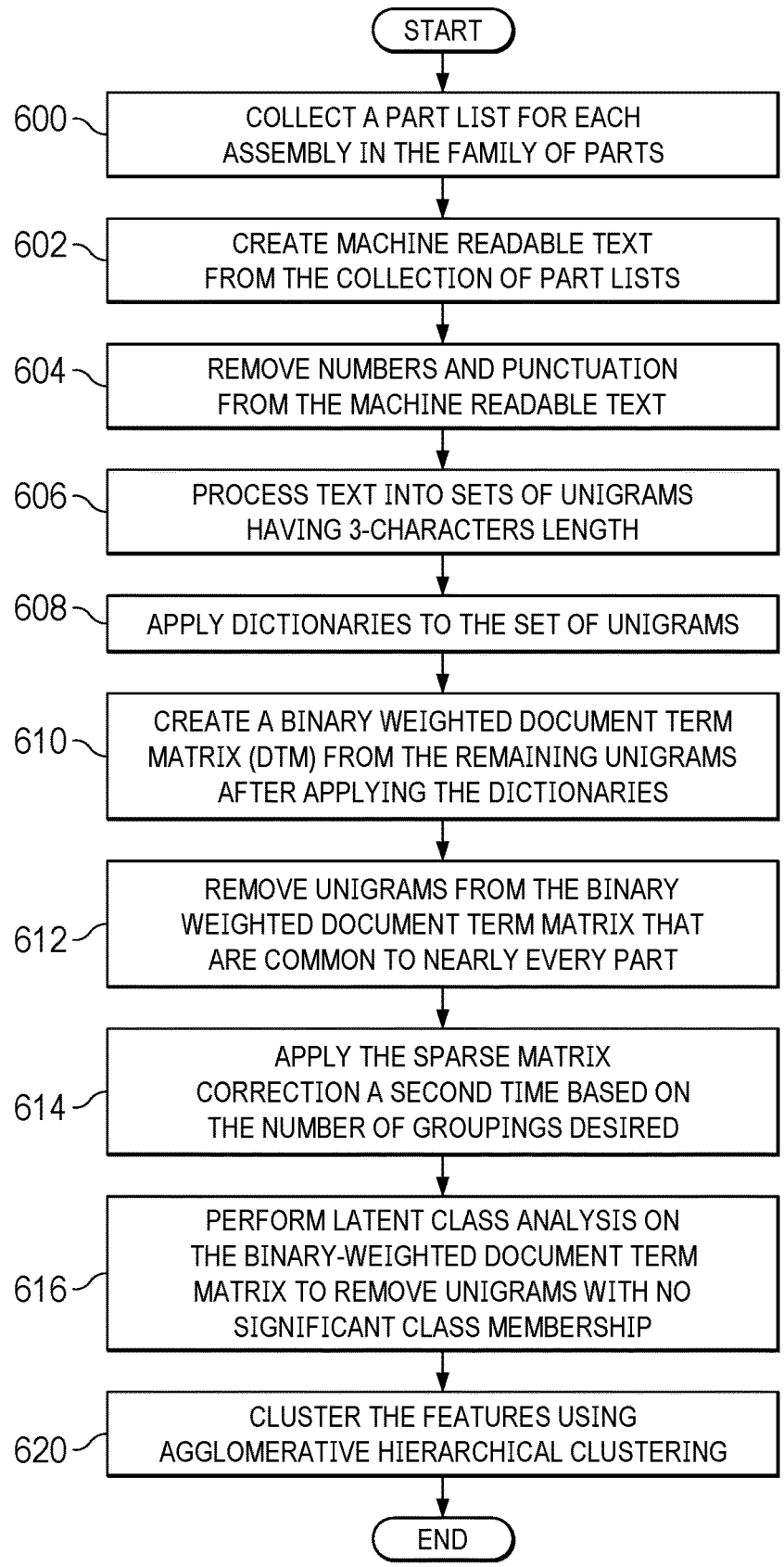
FIG. 6 is a flowchart of a process for grouping parts using part lists in accordance with an illustrative embodiment.

Turning next to FIG. 6, a flowchart of a process for grouping parts using part lists is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in part analyzer 214 in computer system 212 in FIG. 2.

The process begins by collecting a part list for each assembly in the family of parts (operation 600). In operation 600, a part list can take the form of a bill of materials (BOM).

The process creates machine readable text from the collection of part lists (operation 602). The process removes numbers and punctuation from the machine readable text (operation 604). The process processes text into sets of unigrams having 3-characters length (operation 606). In other examples, other character lengths can be used. The character length can be selected to not create unigrams for words that are too short to be useful in distinguishing parts from each other, such as "a", "is", and "of".

The process applies dictionaries to the set of unigrams (operation 608). In this example, three dictionaries are used in the following order: acronyms and concatenations, synonyms and spelling, and stop words. The dictionaries in this illustrative example are domain specific to the family of parts being process.

The process creates a binary weighted document term matrix (DTM) from the remaining unigrams after applying the dictionaries (operation 610). The process removes unigrams from the binary weighted document term matrix that are common to nearly every part (operation 612). In operation 612, a unigram can be considered to be common when unigrams occur a number of times in the document term matrix that is greater than a threshold. For example, a threshold of 90% can be used to remove the unigrams. This removal of unigrams can be performed using a matrix correction when many zeros are present in the document term matrix.

The process applies the sparse matrix correction a second time based on the number of groupings desired (operation 614). In step 614, the binary weighted document term matrix can be a sparse matrix based on the number of 0s in the matrix. The process performs dimensionality reduction on the remaining unigrams in the document term matrix to create features for clustering (operation 618). Each feature in operation 618 is derived from two or more unigrams for the components.

The process then clusters the features using agglomerative hierarchical clustering (operation 620). The process terminates thereafter. In operation 620, other types of clustering can be used in place of agglomerative hierarchical clustering in other illustrative examples. For example, a density based spatial clustering of applications with noise (DBSCAN) algorithm, K means algorithm, a Gaussian mixture models (GMM) algorithm, Ordering points to identify the clustering structure (OPTICS), or other suitable type of clustering algorithm can be used in other illustrative examples.

Figure 7:
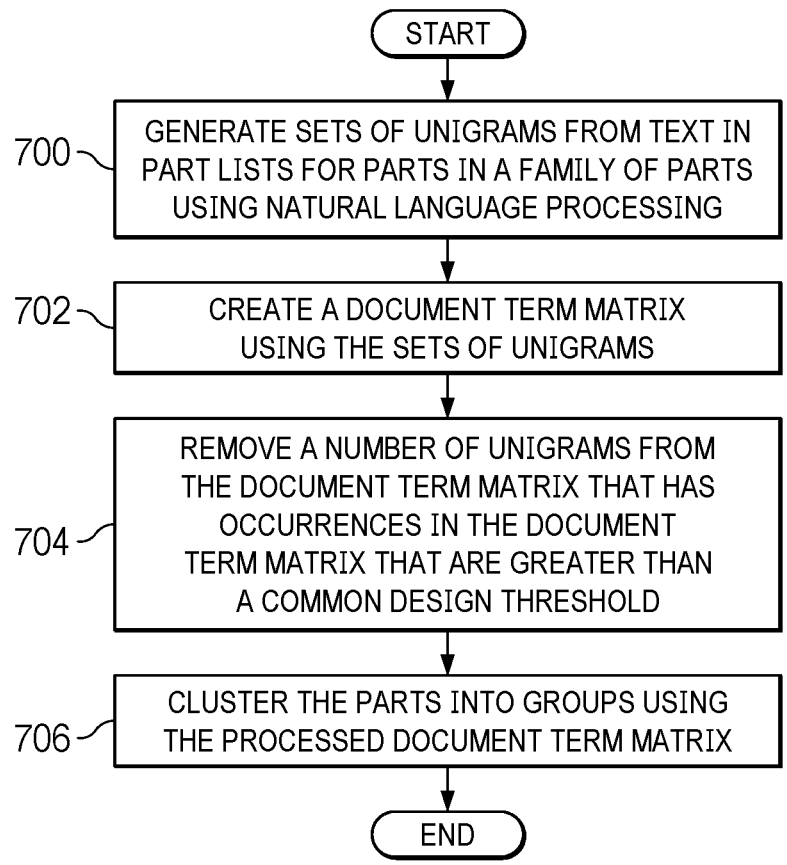
FIG. 7 is an illustration of a flowchart of a process for grouping parts in accordance with an illustrative embodiment.

Turning next to FIG. 7, an illustration of a flowchart of a process for grouping parts is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in part analyzer 214 in computer system 212 in FIG. 2.

The process begins by generating sets of unigrams from text in part lists for parts in a family of parts using natural language processing (operation 700). In operation 700, a set of unigrams in the sets of unigrams represent components for a part in the parts.

The process creates a document term matrix using the sets of unigrams (operation 702). In this operation, the document term matrix describes a presence of components in the parts.

The process removes a number of unigrams from the document term matrix that has occurrences in the document term matrix that are greater than a common design threshold (operation 704). In operation 704, removing the number of unigrams from the document term matrix forms a processed document term matrix and wherein the common design threshold identifies a level of occurrence not useful in differentiating the parts from each other.

The process clusters the parts into groups using the processed document term matrix (operation 706). The process terminates thereafter.

Figure 8:
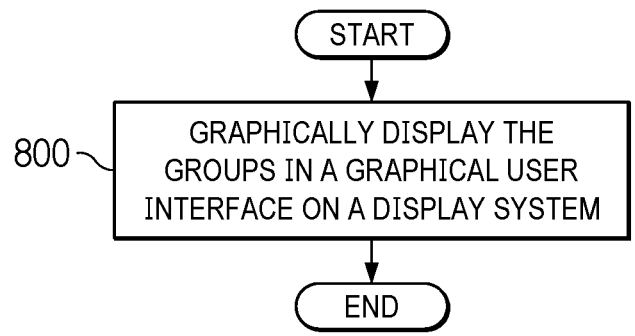
FIG. 8 is an illustration a flowchart of a process for displaying a result from grouping parts in accordance with an illustrative embodiment.

With reference to FIG. 8, an illustration a flowchart of a process for displaying a result from grouping parts is depicted in accordance with an illustrative embodiment. The process in FIG. 8 is an example of an additional operation that can be performed with the operations in FIG. 7.

The process graphically displays the groups in a graphical user interface on a display system (operation 800). The process terminates thereafter.

In operation 800, The groups can be displayed using a number of different types of graphical displays to provide visualization of the groups to a human operator. For example, the groups can be displayed in a constellation diagram in which points connected by edges, wherein the points represent parts and graphical indicators associated with the points represent groupings of the parts and lengths of edges indicates a similarity of nodes connected by the edges.

Figure 9:
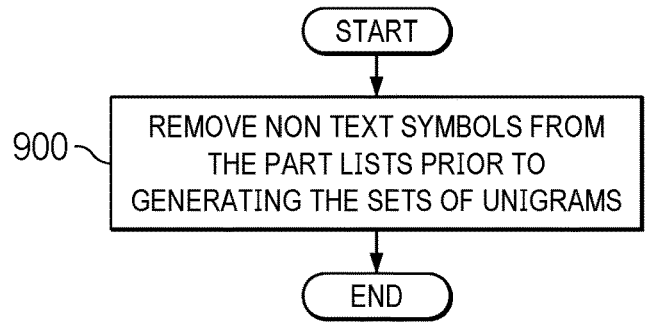
FIG. 9 is an illustration of a flowchart of a process for processing text in part lists in accordance with an illustrative embodiment.

Next in FIG. 9, an illustration of a flowchart of a process for processing text in part lists is depicted in accordance with an illustrative embodiment. The process in this figure is an example of an additional operation that can form with the operations in FIG. 7.

The process removes non-text symbols from the part lists prior to generating the sets of unigrams (operation 900). The process terminates thereafter. In operation 900, the non-text symbols can be, for example, punctuation, numbers, and other non-text symbols.

Figure 10:
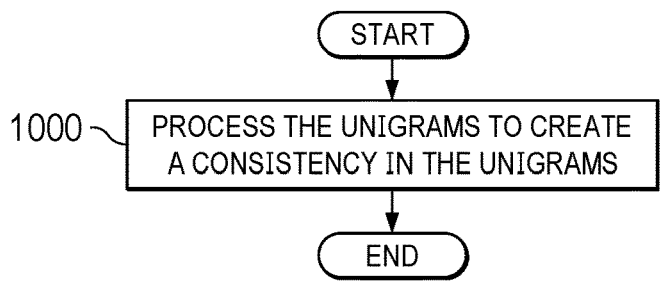
FIG. 10 is an illustration of a flowchart of a process for processing unigrams in accordance with an illustrative embodiment.

With reference now to FIG. 10, an illustration of a flowchart of a process for processing unigrams is depicted in accordance with an illustrative embodiment. The process illustrated in FIG. 10 is an example of an additional operation that can be performed with the operations in FIG. 7.

The process processes the unigrams to create a consistency in the unigrams (operation 1000). The process terminates thereafter. This operation can be performed on the unigrams prior to the unigrams being used to create a document term matrix in operation 702. This consistency can include, for example, removing spelling errors, removing concatenation errors, using consistent terms for the same components, and other operations to increase the consistency the unigrams used to reference the components in the parts.

Figure 11:
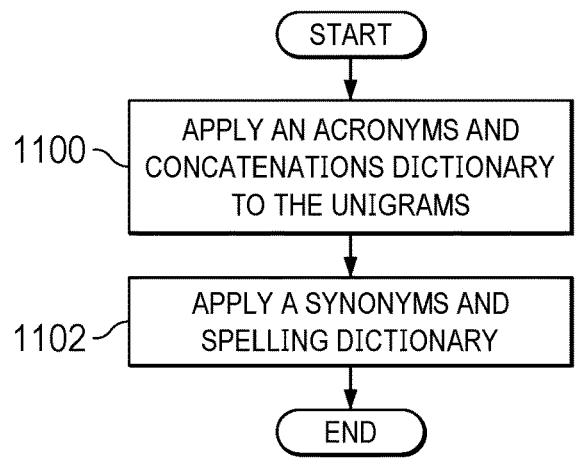
FIG. 11 is an illustration of a flowchart of a process for applying dictionaries to unigrams in accordance with an illustrative embodiment.

Next in FIG. 11, an illustration of a flowchart of a process for applying dictionaries to unigrams is depicted in accordance with an illustrative embodiment. The operations in this figure are an example of an implementation of operation 1000 in FIG. 10.

The process begins by applying an acronyms and concatenations dictionary to the unigrams (operation 1100). The dictionary in operation 1100 can be domain specific to the particular family of parts. This process can be used to expand acronyms such as the unigrams that use words rather than acronyms. In another example, the words can be changed into acronyms such that all the unigrams are consistent for a particular component. The concatenations can be used to remove incorrect concatenations or create concatenations that are correct for the unigrams based on the usage in the dictionary.

The process applies a synonyms and spelling dictionary to the unigrams (operation 1102). The process terminates thereafter. This dictionary can also be a domain specific dictionary for synonyms used for a particular family of parts. This dictionary can be applied such the unigrams use the same wording for the same components in a family of parts.

Figure 12:
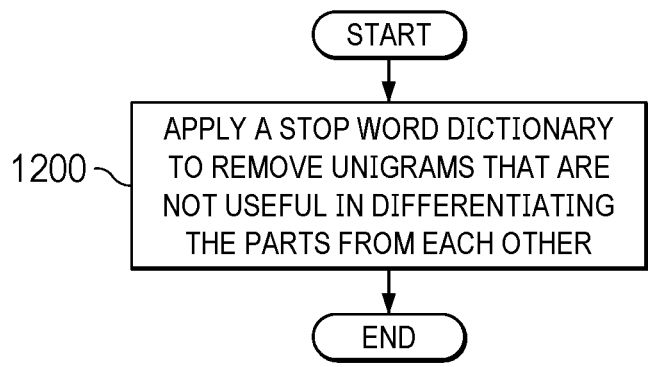
FIG. 12 is an illustration a flowchart of a process for removing unigrams in accordance with an illustrative embodiment.

With reference next to FIG. 12, an illustration a flowchart of a process for removing unigrams is depicted in accordance with an illustrative embodiment. The process illustrated in this figure is an example of an additional operation that can be performed with the operations in FIG. 7. This operation can be performed prior to creating a document term matrix using the unigrams operation 702.

The process applies a stop word dictionary to remove unigrams that are not useful in differentiating the parts from each other (operation 1200). The process terminates thereafter. In this operation, the stop word dictionary can be used to remove non-technical unigrams. These non-technical unigrams are not associated with the design features for parts in the family of parts. For example, words such as sealant, paint, fasteners, o-ring, or other unigrams represent components in the parts. However, the unigrams are components that are known to be so common that they do not help differentiate parts from each other.

Figure 13:
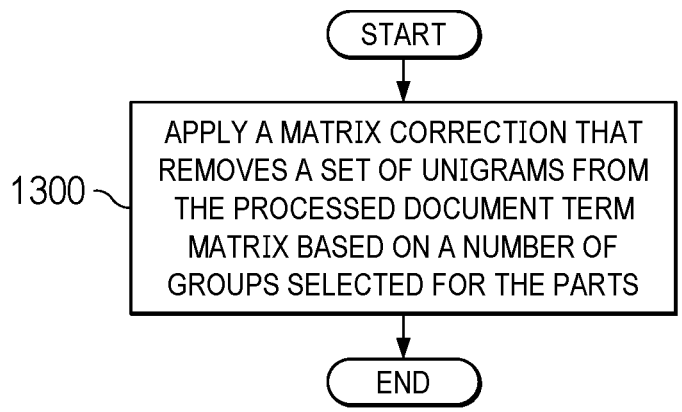
FIG. 13 is an illustration flowchart for a process to remove unigrams based on the number groupings desired in accordance with an illustrative embodiment.

With reference now to FIG. 13, an illustration flowchart for a process to remove unigrams based on the number groupings desired is depicted in accordance with an illustrative embodiment. The process in FIG. 13 is an example of an additional operation that can be performed with the operations in FIG. 7. In one example, this process can be applied to the document term matrix prior to or after removing unigrams in operation 704.

The process applies a matrix correction that removes a set of unigrams from the processed document term matrix based on a number of groups selected for the parts (operation 1300). The process terminates thereafter.

Figure 14:
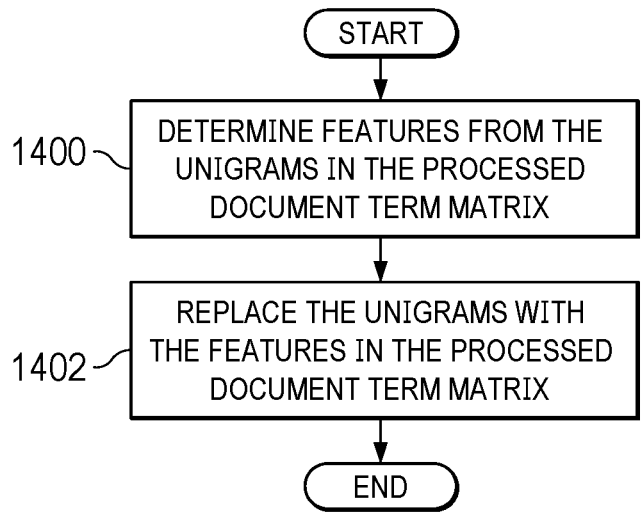
FIG. 14 is an illustration of a flowchart of a process for reducing dimensions in a document term matrix in accordance with an illustrative embodiment.

In FIG. 14, an illustration of a flowchart of a process for reducing dimensions in a document term matrix is depicted in accordance with an illustrative embodiment. The process in FIG. 14 is an example of an additional operation that can be performed with the operations in FIG. 7. In this example, this operation can be performed after operation 704 using the process document term matrix created in operation 704.

The process determines features from the unigrams in the processed document term matrix (operation 1400). In this operation, the features are formed from a combination of the unigrams.

The process replaces the unigrams with the features in the processed document term matrix (operation 1402). The process terminates thereafter.

Figure 15:
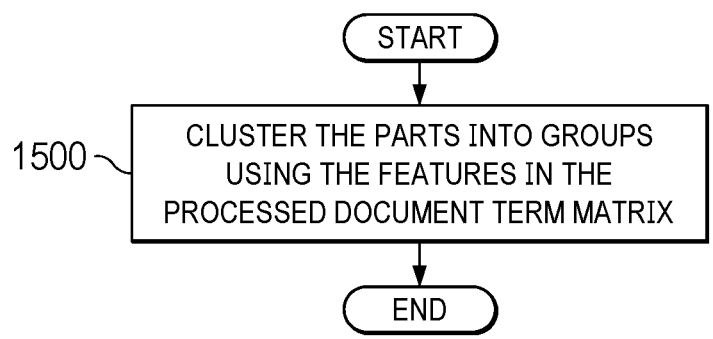
FIG. 15 is an illustration of a flowchart for clustering a document term matrix in accordance with an illustrative embodiment.

Turning now to FIG. 15, an illustration of a flowchart for clustering a document term matrix is depicted in accordance with an illustrative embodiment. The process illustrated in this flowchart is an example of an implementation for operation 706 in FIG. 7.

The process clusters the parts into groups using the features in the processed document term matrix (operation 1500). The process terminates thereafter.

Figure 16:
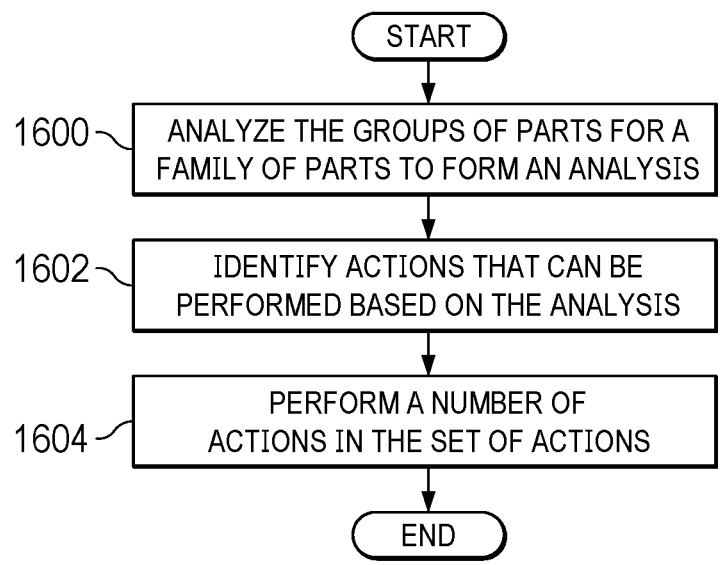
FIG. 16 is an illustration flowchart of a process for managing parts using groups of parts in accordance with an illustrative embodiment.

With reference now to FIG. 16, an illustration of a flowchart of a process for managing parts using groups of parts is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in part analyzer 214 in computer system 212 in FIG. 2.

The process begins by analyzing the groups of parts for a family of parts to form an analysis (operation 1600). The process identifies actions that can be performed based on the analysis (operation 1602).

The process performs a number of actions in the set of actions (operation 1604). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
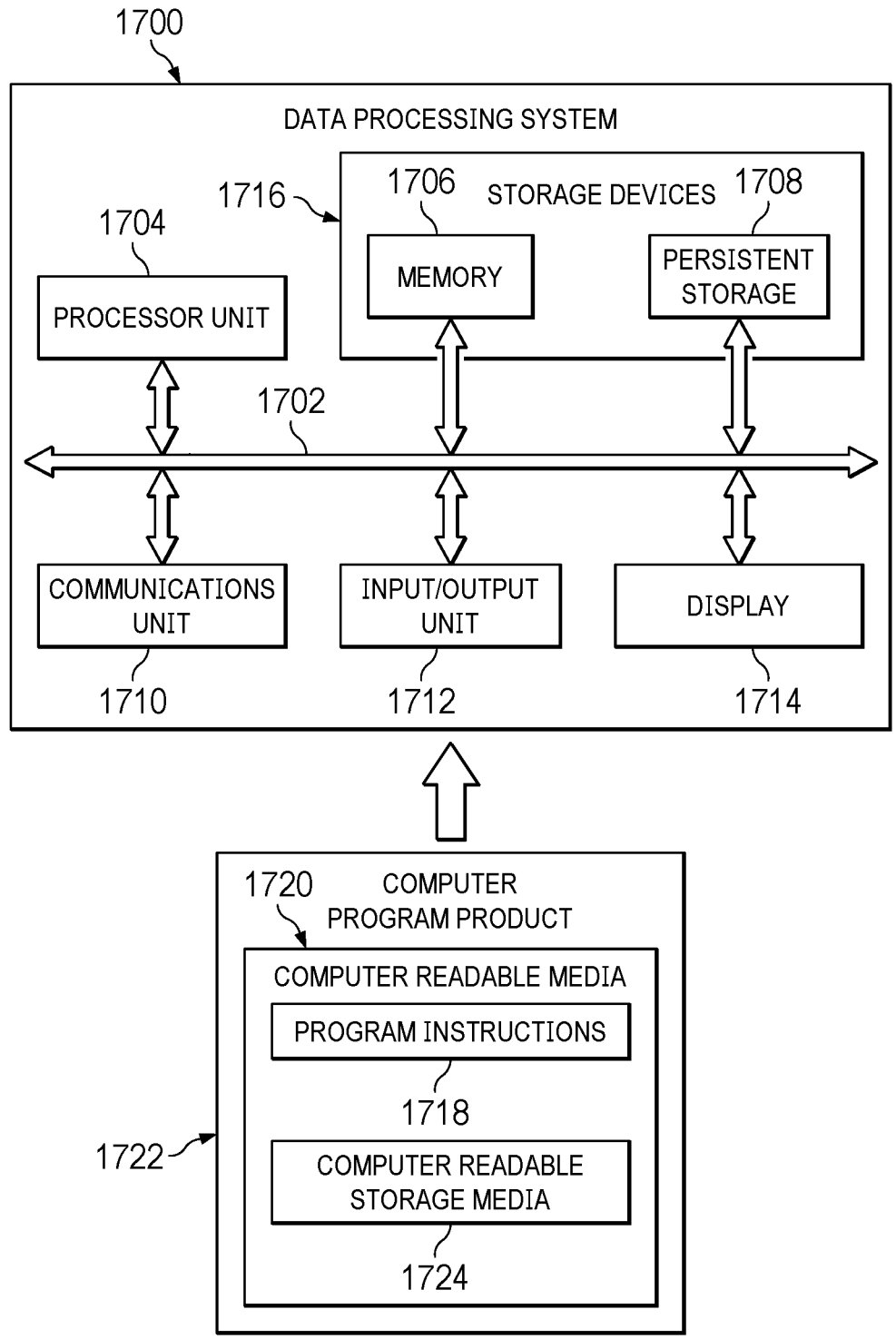
FIG. 17 is an illustration of a block diagram of a data processing system in accordance with an illustrative embodiment.

Turning now to FIG. 17, a block diagram of a data processing system is depicted in accordance with an illustrative embodiment. Data processing system 1700 can be used to implement server computer 104, server computer 106, client devices 110, in FIG. 1. Data processing system 1700 can also be used to implement computer system 212 in FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can may be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1716 may also be referred to as computer readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are referred to as program instructions, computer usable program instructions, or computer readable program instructions that can be read and executed by a processor in processor unit 1704. The program instructions in the different embodiments can be embodied on different physical or computer readable storage media, such as memory 1706 or persistent storage 1708.

Program instructions 1718 are located in a functional form on computer readable media 1720 that is selectively removable and can be loaded onto or transferred to data processing system 1700 for execution by processor unit 1704. Program instructions 1718 and computer readable media 1720 form computer program product 1722 in these illustrative examples. In the illustrative example, computer readable media 1720 is computer readable storage media 1724.

Computer readable storage media 1724 is a physical or tangible storage device used to store program instructions 1718 rather than a medium that propagates or transmits program instructions 1718. Computer readable storage media 1724 can be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAN), a read-only memory (ROM), an erasable programmable read-only memory (EPROM or Flash memory), a static random access memory (SPA), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1724, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1718 can be transferred to data processing system 1700 using a computer readable signal media. The computer readable signal media are signals and can be, for example, a propagated data signal containing program instructions 1718. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1720" can be singular or plural. For example, program instructions 1718 can be located in computer readable media 1720 in the form of a single storage device or system. In another example, program instructions 1718 can be located in computer readable media 1720 that is distributed in multiple data processing systems. In other words, some instructions in program instructions 1718 can be located in one data processing system while other instructions in program instructions 1718 can be located in one data processing system. For example, a portion of program instructions 1718 can be located in computer readable media 1720 in a server computer while another portion of program instructions 1718 can be located in computer readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program instructions 1718.

Figure 18:
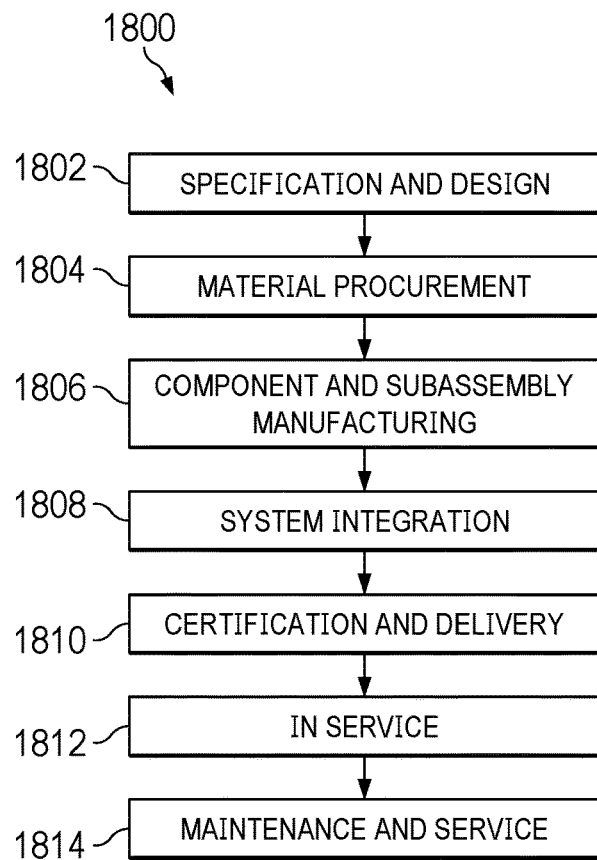
FIG. 18 is an illustration of an aircraft manufacturing and service method in accordance with an illustrative embodiment.
Figure 19:
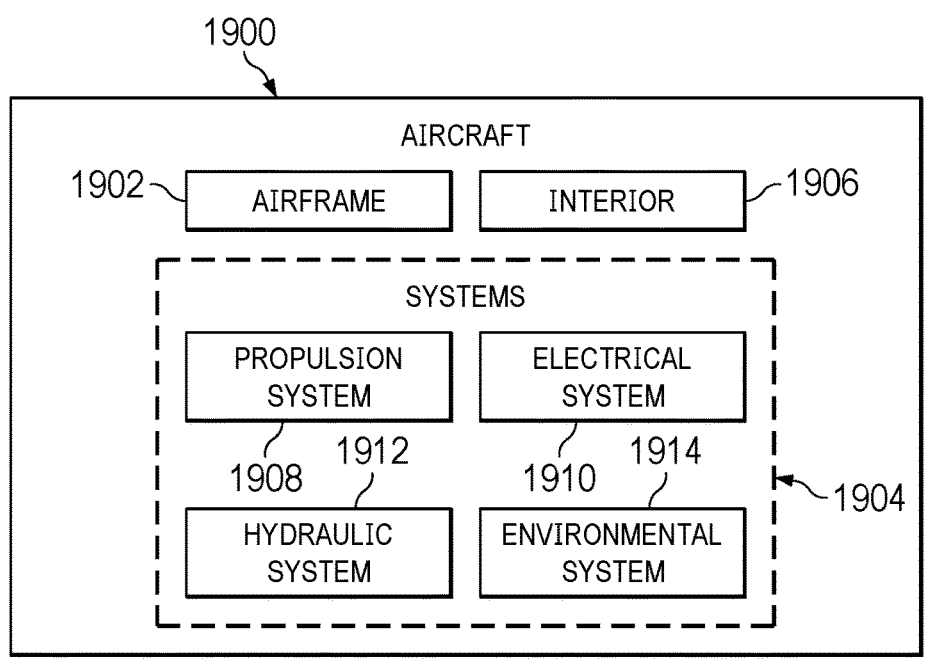
FIG. 19 is an illustration of a block diagram of an aircraft in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 can go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 can be fabricated or manufactured in a manner similar to components or subassemblies produced while aircraft 1900 is in service 1812 in FIG. 18. As yet another example, one or more apparatus embodiments, method embodiments, or a combination thereof can be utilized during production stages, such as component and subassembly manufacturing 1806 and system integration 1808 in FIG. 18. One or more apparatus embodiments, method embodiments, or a combination thereof may be utilized while aircraft 1900 is in service 1812, during maintenance and service 1814 in FIG. 18, or both. The use of a number of the different illustrative embodiments may substantially expedite the assembly of aircraft 1900, reduce the cost of aircraft 1900, or both expedite the assembly of aircraft 1900 and reduce the cost of aircraft 1900.

For example, part analyzer 214 in FIG. 2 can be used during material procurement 1804 to identify cost reductions and manage supply chains based on identifying groups of parts throughout different product lines. Additionally, the groupings identified by part analyzer 214 can be used to identify substitute or equivalent parts that may be used during maintenance and service 1814, which may include modification, reconfiguration, refurbishment, and other maintenance or service. As another example, the groupings of parts made by part analyzer 214 can be used to make adjustments or design changes such that fewer number of parts are used throughout a product line.

Some features of the illustrative examples are described in the following clauses. These clauses are examples of features and are not intended to limit other illustrative examples.

Clause 1

A method for grouping parts, the method comprising:

generating, by a computer system, sets of unigrams from text in part lists for parts in a family of parts using natural language processing, wherein a set of unigrams in the sets of unigrams represent components for a part in the parts;

creating, by the computer system, a document term matrix using the sets of unigrams, wherein the document term matrix describes a presence of components in the parts;

removing, by the computer system, a number of unigrams from the document term matrix that has occurrences in the document term matrix that are greater than a common design threshold, wherein removing the number of unigrams from the document term matrix forms a processed document term matrix and wherein the common design threshold identifies a level of occurrence not useful in differentiating the parts from each other; and clustering, by the computer system, the parts into groups using the processed document term matrix.

Clause 2

The method according to clause 1 further comprising:

graphically displaying, by the computer system, the groups in a graphical user interface on a display system.

Clause 3

The method according to clause 2, wherein the groups are displayed in a constellation diagram in which points connected by edges, wherein the points represent parts and graphical indicators associated with the points represent groupings of the parts and lengths of edges indicates a similarity of nodes connected by the edges.

Clause 4

The method according to one of clauses 1, 2, or 3 further comprising:

removing, by the computer system, non-text symbols from the part lists prior to generating the sets of unigrams.

Clause 5

The method according to one of clauses 1, 2, 3, or 4 further comprising:

processing, by the computer system, the unigrams to create a consistency in the unigrams.

Clause 6

The method according to clause 5, wherein processing, by the computer system, the unigrams to create the consistency in the unigrams comprises:

applying, by the computer system, an acronyms and concatenations dictionary to the unigrams; and applying, by the computer system, a synonyms and spelling dictionary to the unigrams.

Clause 7

The method according to one of clauses 1, 2, 3, 4, or 6 further comprising:

applying, by the computer system, a stop word dictionary to remove unigrams that are not useful in differentiating the parts from each other.

Clause 8

The method according to one of clauses 1, 2, 3, 4, 6, or 7 further comprising:

applying, by the computer system, a matrix correction that removes a set of unigrams from the processed document term matrix based on a number of groups selected for the parts.

Clause 9

The method according to one of clauses 1, 2, 3, 4, 6, 7, or 8 further comprising:

determining, by the computer system, features from the unigrams in the processed document term matrix, wherein the features are formed from a combination of the unigrams; and replacing, by the computer system, the unigrams with the features in the processed document term matrix.

Clause 10

The according to clause 9, wherein clustering, by the computer system, the parts into groups using the processed document term matrix comprises:

clustering, by the computer system, the parts into groups using the features in the processed document term matrix.

Clause 11

The method according to one of clauses 1, 2, 3, 4, 6, 7, 8, 9, or 10, wherein the document term matrix comprises columns for the unigrams and rows for the parts.

Clause 12

A method for grouping parts, the method comprising:

generating, by a computer system, sets of unigrams from text in part lists for parts in a family of parts using natural language processing, wherein a set of unigrams in the sets of unigrams represent components for a part in the parts;

creating, by the computer system, a document term matrix using the sets of unigrams, wherein the document term matrix describes a presence of components in the parts;

removing, by the computer system, a number of unigrams from the document term matrix that has occurrences in the document term matrix that are greater than a common design threshold, wherein removing the number of unigrams from the document term matrix forms a processed document term matrix and wherein the common design threshold identifies a level of occurrence not useful in differentiating the parts from each other;

determining, by the computer system, features from the unigrams in the processed document term matrix, wherein the features are formed from a combination of the unigrams;

replacing, by the computer system, the unigrams with the features in the processed document term matrix; and clustering, by the computer system, the parts into groups using the processed document term matrix.

Clause 13

The method according to one of clause 12 further comprising:

removing, by the computer system, non-text symbols from the part lists prior to generating the sets of unigrams.

Clause 14

The method according to one of clauses 12 or 13 further comprising:

processing, by the computer system, the unigrams to create a consistency in the unigrams.

Clause 15

The method according to clause 14, wherein processing, by the computer system, the unigrams to create the consistency in the unigrams comprises:

applying, by the computer system, a first dictionary of acronyms and concatenations to the unigrams; and applying, by the computer system, a second dictionary of synonyms and spelling.

Clause 16

The method according to one of clauses 12, 13, 14, or 15 further comprising:

applying, by the computer system, a stop word dictionary to remove unigrams that are not useful in differentiating the parts from each other.

Clause 17

A part analysis system comprising:

a computer system; and a part analyzer in the computer system, wherein the part analyzer is configured to:

generate sets of unigrams from text in part lists for parts in a family of parts using natural language processing, wherein a set of unigrams in the sets of unigrams represent components for a part in the parts;

create a document term matrix using the sets of unigrams, wherein the document term matrix describes a presence of components in the parts;

remove a number of unigrams from the document term matrix that has occurrences in the document term matrix that are greater than a common design threshold, wherein removing the number of unigrams from the document term matrix forms a processed document term matrix and wherein the common design threshold identifies a level of occurrence not useful in differentiating the parts from each other; and cluster the parts into groups using the processed document term matrix.

Clause 18

The part analysis system according to clause 17, wherein the part analyzer is configured to:

graphically display the groups in a graphical user interface on a display system.

Clause 19

The part analysis system according to clause 18, wherein the groups are displayed in a constellation diagram in which points connected by edges, wherein the points represent parts and graphical indicators associated with the points represent groupings of the parts and lengths of edges indicates a similarity of nodes connected by the edges.

Clause 20

The part analysis system according to one of clauses 17, 18, or 19, wherein the part analyzer is configured to:

remove non-text symbols from the part lists prior to generating the sets of unigrams.

Clause 21

The part analysis system according to one of clauses 17, 18, 19, or 20, wherein the part analyzer is configured to:

process the unigrams to create a consistency in the unigrams.

Clause 22

22. The part analysis system according to clause 21, wherein in processing the unigrams to create the consistency in the unigrams comprises, the part analyzer is configured to:

apply a first dictionary of acronyms and concatenations to the unigrams; and apply a second dictionary of synonyms and spelling.

Clause 23

The part analysis system according to one of clauses 17, 18, 19, 20, or 21, wherein the part analyzer is configured to:

applying a stop word dictionary to remove unigrams that are not useful in differentiating the parts from each other.

Clause 24

The part analysis system according to one of clauses 17, 18, 19, 20, 21, 22, or 23, wherein the part analyzer is configured to:

apply a matrix correction that removes a set of unigrams from the processed document term matrix based on a number of groups selected for the parts.

Clause 25

The part analysis system according to one of clauses 17, 18, 19, 20, 21, 22, 23, or 24, wherein the part analyzer is configured to:

determine features from the unigrams in the processed document term matrix, wherein the features are formed from a combination of the unigrams; and replacing the unigrams with the features in the processed document term matrix.

26. The part analysis system according to clause 15, wherein in clustering the parts into groups using the processed document term matrix, the part analyzer is configured to:

cluster the parts into groups using the features in the processed document term matrix.

Clause 27

27. The part analysis system according to one of clauses 17, 18, 19, 20, 21, 22, 23, 24, 25, or 26, wherein the document term matrix comprises columns for the unigrams and rows for the parts.

Clause 28

A computer program product for grouping parts, the computer program product comprising a computer readable storage medium having program instructions embodied therewith, the program instructions executable by a computer system to cause the computer system to perform a method of:

generating sets of unigrams from text in part lists for parts in a family of parts using a natural language processing method, wherein a set of unigrams in the sets of unigrams represent components for a part in the parts;

creating a document term matrix using the sets of unigrams, wherein the document term matrix describes a presence of components in the parts;

removing a number of unigrams from the document term matrix that has occurrences in the document term matrix that are greater than a common design threshold, wherein removing the number of unigrams from the document term matrix forms a processed document term matrix and wherein the common design threshold identifies a level of occurrence not useful in differentiating the parts from each other; and clustering the parts into groups using the processed document term matrix.

As result, processing part lists using combinations of the various techniques described for part analyzer 214 increases performance in grouping or sorting parts into groups. Further, the different techniques remove unigrams for components that do not represent design differentiating features in a document term matrix. As a result, less unigrams are processed resulting in increased performance that can lead to a lower use of resources in the computer system. This removal of unigrams without design differentiating features reduces noise in processing data, enabling increasing performance in grouping parts. Additionally, the part analyzer can also preprocess the part to remove unnecessary information prior to generating unigrams from the part list. Further, dimension reduction can occur by creating features from unigrams to further reduce the amounts of processing needed to cluster parts into groups.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for grouping parts, the method comprising:
generating, by a computer system, sets of unigrams from text in part lists for parts in a family of parts using natural language processing, wherein a set of unigrams in the sets of unigrams represent components for a part in the parts;
creating, by the computer system, a document term matrix using the sets of unigrams, wherein the document term matrix describes a presence of components in the parts;
removing, by the computer system, a number of unigrams from the document term matrix that has occurrences in the document term matrix that are greater than a common design threshold, wherein removing the number of unigrams from the document term matrix forms a processed document term matrix and wherein the common design threshold identifies a level of occurrence not useful in differentiating the parts from each other;
clustering, by the computer system, the parts into groups using the processed document term matrix; and
graphically displaying, by the computer system, the groups in a graphical user interface on a display system, wherein the groups are displayed in a constellation diagram in which points connected by edges, wherein the points represent parts and graphical indicators associated with the points represent groupings of the parts and lengths of edges indicates a similarity of nodes connected by the edges.

2. The method of claim 1 further comprising:
removing, by the computer system, non-text symbols from the part lists prior to generating the sets of unigrams.

3. The method of claim 1 further comprising:
processing, by the computer system, the unigrams to create a consistency in the unigrams.

4. The method of claim 3, wherein processing, by the computer system, the unigrams to create the consistency in the unigrams comprises:
applying, by the computer system, an acronyms and concatenations dictionary to the unigrams; and
applying, by the computer system, a synonyms and spelling dictionary to the unigrams.

5. The method of claim 1 further comprising:
applying, by the computer system, a stop word dictionary to remove unigrams that are not useful in differentiating the parts from each other.

6. The method of claim 1 further comprising:
applying, by the computer system, a matrix correction that removes a set of unigrams from the processed document term matrix based on a number of groups selected for the parts.

7. The method of claim 1 further comprising:
determining, by the computer system, features from the unigrams in the processed document term matrix, wherein the features are formed from a combination of the unigrams; and
replacing, by the computer system, the unigrams with the features in the processed document term matrix.

8. The method of claim 7, wherein clustering, by the computer system, the parts into groups using the processed document term matrix comprises:
clustering, by the computer system, the parts into groups using the features in the processed document term matrix.

9. A method for grouping parts, the method comprising:
generating, by a computer system, sets of unigrams from text in part lists for parts in a family of parts using natural language processing, wherein a set of unigrams in the sets of unigrams represent components for a part in the parts;
creating, by the computer system, a document term matrix using the sets of unigrams, wherein the document term matrix describes a presence of components in the parts;
removing, by the computer system, a number of unigrams from the document term matrix that has occurrences in the document term matrix that are greater than a common design threshold, wherein removing the number of unigrams from the document term matrix forms a processed document term matrix and wherein the common design threshold identifies a level of occurrence not useful in differentiating the parts from each other;

determining, by the computer system, features from the unigrams in the processed document term matrix, wherein the features are formed from a combination of the unigrams;

replacing, by the computer system, the unigrams with the features in the processed document term matrix;

clustering, by the computer system, the parts into groups using the processed document term matrix; and graphically displaying, by the computer system, the groups in a graphical user interface on a display system, wherein the groups are displayed in a constellation diagram in which points connected by edges, wherein the points represent parts and graphical indicators associated with the points represent groupings of the parts and lengths of edges indicates a similarity of nodes connected by the edges.

10. The method of claim 9, further comprising:

removing, by the computer system, non-text symbols from the part lists prior to generating the sets of unigrams.

11. The method of claim 9, further comprising:

processing, by the computer system, the unigrams to create a consistency in the unigrams.

12. The method of claim 11, wherein processing, by the computer system, the unigrams to create the consistency in the unigrams comprises:

applying, by the computer system, an acronyms and concatenations dictionary to the unigrams; and applying, by the computer system, a synonyms and spelling dictionary to the unigrams.

13. The method of claim 9, further comprising:

applying, by the computer system, a stop word dictionary to remove unigrams that are not useful in differentiating the parts from each other.

14. The method of claim 9, further comprising:

applying, by the computer system, a matrix correction that removes a set of unigrams from the processed document term matrix based on a number of groups selected for the parts.

15. The method of claim 9, further comprising:

determining, by the computer system, features from the unigrams in the processed document term matrix, wherein the features are formed from a combination of the unigrams; and replacing, by the computer system, the unigrams with the features in the processed document term matrix.

16. The method of claim 15, wherein clustering, by the computer system, the parts into groups using the processed document term matrix comprises:

clustering, by the computer system, the parts into groups using the features in the processed document term matrix.

17. A part analysis system comprising:

a computer system; and a part analyzer in the computer system, wherein the part analyzer is configured to:

generate sets of unigrams from text in part lists for parts in a family of parts using natural language processing, wherein a set of unigrams in the sets of unigrams represent components for a part in the parts;

create a document term matrix using the sets of unigrams, wherein the document term matrix describes a presence of components in the parts;

remove a number of unigrams from the document term matrix that has occurrences in the document term matrix that are greater than a common design threshold, wherein removing the number of unigrams from the document term matrix forms a processed document term matrix and wherein the common design threshold identifies a level of occurrence not useful in differentiating the parts from each other;

cluster the parts into groups using the processed document term matrix; and graphically display the groups in a graphical user interface on a display system, wherein the groups are displayed in a constellation diagram in which points connected by edges, wherein the points represent parts and graphical indicators associated with the points represent groupings of the parts and lengths of edges indicates a similarity of nodes connected by the edges.

18. The part analysis system of claim 17, wherein the part analyzer is configured to:

remove non-text symbols from the part lists prior to generating the sets of unigrams.

19. The part analysis system of claim 17, wherein the part analyzer is configured to:

process the unigrams to create a consistency in the unigrams.

20. The part analysis system of claim 19, wherein in processing the unigrams to create the consistency in the unigrams comprises, the part analyzer is configured to:

apply a first dictionary of acronyms and concatenations to the unigrams; and apply a second dictionary of synonyms and spelling.

21. The part analysis system of claim 17, wherein the part analyzer is configured to:

applying a stop word dictionary to remove unigrams that are not useful in differentiating the parts from each other.

22. The part analysis system of claim 17, wherein the part analyzer is configured to:

apply a matrix correction that removes a set of unigrams from the processed document term matrix based on a number of groups selected for the parts.

23. The part analysis system of claim 17, wherein the part analyzer is configured to:

determine features from the unigrams in the processed document term matrix, wherein the features are formed from a combination of the unigrams; and replacing the unigrams with the features in the processed document term matrix.

24. The part analysis system of claim 23, wherein in clustering the parts into groups using the processed document term matrix, the part analyzer is configured to:

cluster the parts into groups using the features in the processed document term matrix.

* * * * *